(12) United States Patent
Brambilla et al.

(10) Patent No.: US 6,300,635 B1
(45) Date of Patent: Oct. 9, 2001

(54) LOW ENERGY SENSITIVE X-GAMMA DOSIMETER

(75) Inventors: Andrea Brambilla, Palaiseau; Thierry Pochet, Bonnelles, both of (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/254,850

(22) PCT Filed: Sep. 10, 1997

(86) PCT No.: PCT/FR97/01596

§ 371 Date: May 17, 1999

§ 102(e) Date: May 17, 1999

(87) PCT Pub. No.: WO98/11454

PCT Pub. Date: Mar. 19, 1998

(30) Foreign Application Priority Data

Sep. 11, 1996 (FR) .................................................. 96 11084

(51) Int. Cl.[7] .................................................. G01T 1/00
(52) U.S. Cl. ............................... 250/370.07; 250/370.04; 250/336.1; 250/337
(58) Field of Search ........................... 250/370.07, 336.1, 250/374, 370.04, 390.03, 482.1, 337

(56) References Cited

U.S. PATENT DOCUMENTS

| | | | |
|---|---|---|---|
| 4,489,315 | * 12/1984 | Falk et al. | 340/600 |
| 4,757,202 | 7/1988 | East | 250/370.07 |
| 4,769,547 | * 9/1988 | Uber, III | 250/374 |
| 5,004,921 | * 4/1991 | Moscovitch | 250/390.03 |
| 5,065,031 | * 11/1991 | Moscovitch | 250/486.1 |
| 5,572,027 | * 11/1996 | Tawil et al. | 250/336.1 |
| 5,572,028 | * 11/1996 | Moscovitch et al. | 250/337 |

FOREIGN PATENT DOCUMENTS

| | | | |
|---|---|---|---|
| 0403105 | 12/1990 | (EP) | G01T/1/00 |
| 2255177 | 10/1992 | (GB) | G01T/1/02 |

OTHER PUBLICATIONS

"Evaluation of the dosimetric characteristics of a diamond detector" Rustgi et al 2389 Medical Physics; 22(1995) May; No. 5; Woodbury NY US; pp. 567–570.

* cited by examiner

*Primary Examiner*—Constantine Hannaher
*Assistant Examiner*—Otilia Gabor
(74) *Attorney, Agent, or Firm*—Hayes, Soloway, Hennessey, Grossman & Hage, P.C.

(57) ABSTRACT

An X-gamma dosimeter responsive to low energy values includes X and gamma radiation detectors responding differently in relation to the dose absorbed at low energy. One detector overestimates the dose absorbed with regard to human tissues, while the other detector underestimates the absorbed dose. An electronic processor combines signals supplied by both detectors, the combination being optimized so as to report accurately the dosimetric quantity within a large energy range.

14 Claims, 4 Drawing Sheets

LOW ENERGY SENSITIVE X-GAMMA DOSIMETER

TECHNICAL FIELD

This invention relates to an X-gamma dosimeter responsive to low energy.

The term "low energy" designates energy comprised in the range from about 10 keV to about 50 keV.

The invention is in particular implemented in the field of radiation protection.

BACKGROUND OF THE INVENTION

Most known electronic dosimeters, in particular portable dosimeters, are limited in the low energy range for reasons related to measuring the dose absorbed by an appropriate material, which will be very dependent on this material under about 50 keV.

In fact, dosimetry consists in measuring, from a measure obtained in general by means of a silicon based detector, the dose theoretically absorbed by human tissues.

At high energy, i.e. at energy exceeding about 100 keV, the dose left in the human tissues and the response of such a detector are simply linked together by a proportionality factor which is hardly energy dependent.

Consequently, compensation is easy.

On the other hand, as soon as energy is less than 100 keV, this factor begins to be energy dependent.

This makes it necessary to fine-tune the dosimeter's configuration allowing, among others, for the addition of absorbent materials in front of the detector itself.

However, the mitigation in such absorbent materials is all the more important since the energy of incident X and gamma radiation is low.

Consequently, the dosimeter is essentially no longer responsive to radiation with energy values of less than 50 keV.

And yet, in the field of radiation protection, a low energy radiation involves a risk, especially for the first millimeter of skin where a very large superficial dose can be left.

Therefore, in the field of radiation protection, there is a strong demand for the development of dosimeters with a low energy limit on the order of 10 keV, or even less.

Of course, this demand has increased due to the emergence of new European standards as far as radiation protection is concerned.

In particular, in the case of portable dosimeters, where the X and gamma radiation detector used is a standard silicon based photodiode, there is no simple technical solution available regarding the above-mentioned limitation.

As mentioned above, the 50 keV energy limitation is substantially due to the fact that filters have to be used for compensating the detector's response in terms of dose measuring.

Unfortunately, these filters function as very efficient absorbents at low energy, so that most known dosimeters are not responsive to low energy radiation.

SUMMARY OF THE INVENTION

It is an objective of the present invention to remedy the preceding disadvantages.

With the invention it is possible to compensate the dose response absorbed at low energy, not by adding filters in front of a radiation detector, but by using two radiation detectors responding differently in terms of doses.

One of the detectors overestimates the dose absorbed at low energy with regard to the human tissues.

On the contrary, the other detector underestimates this absorbed dose.

By electronically summing these two responses according to an optimized linear combination it is possible to return perfectly (i.e. within less than ±30%, which is the uncertainty tolerated by current standards) the actual dose absorbed by human tissues, and this is true for a large energy range from about 10 keV up to several MeV.

More generally speaking, the invention combines, in a specific way, the signals provided respectively by the detectors so as to return in the best possible way a dosimetric quantity to be measured.

The present invention provides an X-gamma dosimeter comprising:

a means for detecting X and gamma radiation, such detection means being provided for supplying signals that are functions of the dose absorbed by said detection means, and an electronic means for processing such signals, said electronic processing means being provided for determining a dosimetric quantity from the signals, this dosimeter being characterized in that the detection means comprises a first X and gamma radiation detector and a second X and gamma radiation detector, said first and second detectors responding differently in relation to the dose absorbed at low energy, the first detector overestimating the dose absorbed at low energy with regard to human tissues, the second detector underestimating the dose absorbed at low energy with regard to human tissues, and in that the electronic processing means is provided for building a combination of signals respectively supplied by the first and second detectors, said combination being optimized so as to report accurately the dosimetric quantity within a large energy range.

Said combination can be a linear combination, with the coefficients of this linear combination being optimized so as to report accurately the dosimetric quantity to be measured.

It is also possible to use a non-linear combination of signals respectively supplied by the first and second detectors for measuring this dosimetric quantity.

The latter can be the dose absorbed by human tissues.

According to a first particular embodiment of the inventive dosimeter, the electronic processing means is provided for reporting accurately the actual dose globally absorbed by human tissues.

According to a second particular embodiment, the electronic processing means is provided for reporting accurately the actual dose absorbed by human tissues for a specific tissue depth.

In this case, the electronic processing means is for instance provided for reporting accurately the equivalent of the superficial individual dose, labeled as HP(0.07), or the equivalent of the deep individual dose, labeled as HP(10).

Said dosimetric quantity can also be the equivalent of the ambient dose, the dosimeter then being used as a radiation meter.

The first detector is preferably a silicon based photodiode.

The second detector is preferably a diamond based detector.

It should be noted that the diamond offers the advantage of having an atomic number (Z=6) lower than the average atomic number of human tissues, so that a diamond based detector can underestimate the dosimetric response.

According to a first particular embodiment, the electronic processing means comprises, for each of the first and second detectors, a measuring channel called first measuring channel and comprising a current preamplifier followed by an analog-to-digital converter, with a view to measuring large doses.

According to a second particular embodiment, the electronic processing means comprises, for each of the first and second detectors, a measuring channel called second measuring channel and comprising a charge preamplifier followed by a discriminator, in turn followed by a pulse counter, with a view to measuring small doses.

These two particular embodiments can be combined together.

The electronic processing means then further comprises a switch provided for sending the signals supplied by the first and second detectors, either to the corresponding first measuring channels or the corresponding second measuring channels, with a view to measuring either large doses or small doses.

BRIEF DESCRIPTION OF THE DRAWINGS

The present invention will be better understood when reading the description of illustrative embodiments provided hereafter, strictly by way of example only and not to be restrictive, with reference to the accompanying drawings.

DETAILED DESCRIPTION OF PARTICULAR EMBODIMENTS

Figure 1:
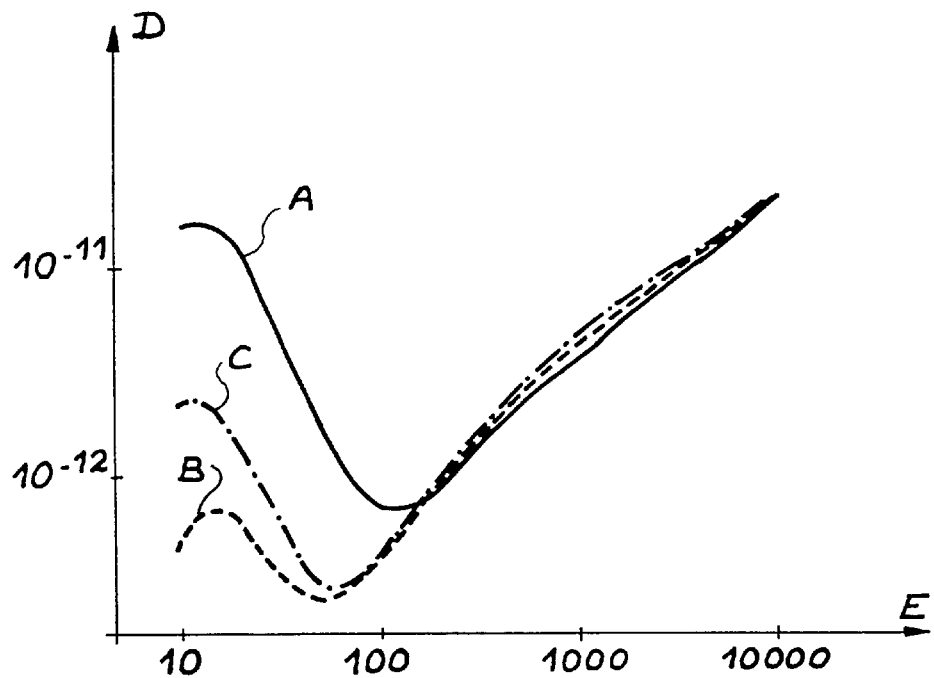
FIG. 1 shows the variations of the dose absorbed per flow unit according to the photon energy, for a silicon based detector (curve A), a diamond based detector (curve B) and human tissues (curve C)

FIG. 1 represents the variations of the dose absorbed per incident flow unit, labeled as D and expressed in Gy.cm², according to the photon energy, labeled as E and expressed in keV, for a silicon based detector (curve A), a diamond based detector (curve B) and human tissue (curve C).

When comparing the respective responses of these different materials, the overestimation induced by the silicon and the underestimation induced by the diamond are clearly apparent at low energy.

In accordance with the present invention, the expression below is reduced for the largest possible energy range, e.g. from 10 keV to 10 MeV:

$$a.R(C^*)+b.R(Si)-R(TH). \tag{1}$$

In this expression, a and b are constants to be determined, and $R(C^*)$, $R(Si)$ and $R(TH)$ respectively represent the responses (in terms of absorbed doses) produced by the diamond based detector, the silicon based detector and human tissue, respectively.

Expression (1) is minimized, for a large number of energy values in the range mentioned above, e.g. by the least square method.

Thus, the following values $a^*$ and $b^*$ are respectively obtained for the coefficients a and b:

$$a^*=9.01\times10^{-1}$$

$$b^*=8.7\times10^{-2}. \tag{2}$$

Figure 2:
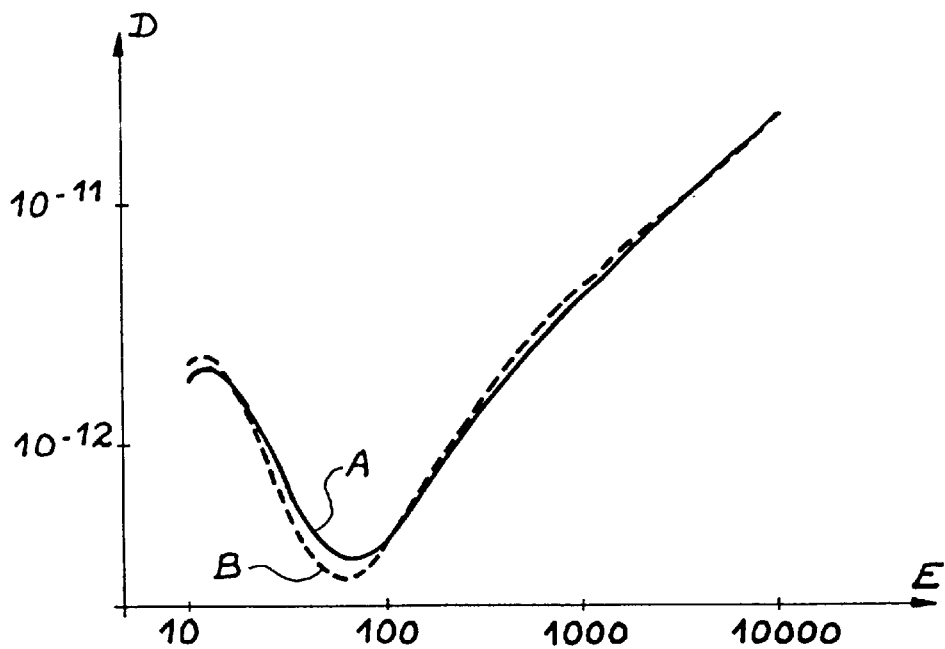
FIG. 2 shows the variations of the dose absorbed per flow unit according to the photon energy corresponding respectively to an optimized linear combination of the responses from said diamond based detector and said silicon based detector (curve A) and to the response of human tissues (curve B)

FIG. 2 shows the result of this optimization and makes it possible to compare the optimized linear combination $$a^*.R(C^*)+b^*.R(Si) \tag{3}$$

of the responses from both detectors (curve A) with the response of human tissue (curve B).

FIG. 2 shows that, from 10 keV on, dose absorption is perfectly reproduced within the tolerated uncertainties.

Figure 3:
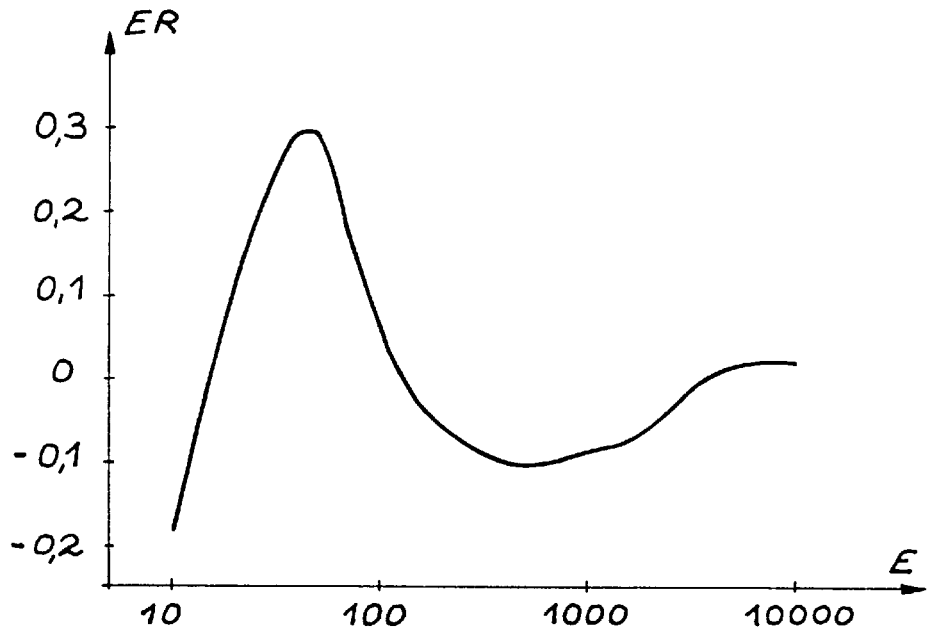
FIG. 3 represents the variations of the relative error between the combined responses of said detectors and the response of human tissues according to the photon energy.

This is illustrated by FIG. 3, which precisely shows the relative error of this optimized linear combination with regard to human tissue, according to the photon energy E.

This relative error ER is given by the following expression:

$$\frac{a^* \cdot R(C^*) + b^* \cdot R(Si) - R(TH)}{R(TH)}. \tag{4}$$

The preceding reflections concern the determination of the actual dose globally absorbed by human tissues.

However, the invention is not limited to the determination of such a globally absorbed dose.

It can also be implemented for determining the actual dose absorbed by human tissues for a specific tissue depth.

In this case, the following quantities are taken into account: the equivalent of the superficial individual dose, labeled as HP (0.07), and the equivalent of the deep individual dose, labeled as HP(10).

Both quantities are used in radiation protection and respectively represent the dose equivalent to 0.07 mm of tissue under the skin and the dose equivalent to 10 mm of tissue under the skin.

Thus, the constants a and b can also be sought enabling the reduction of the following expression:

$$a.HP(0.07)_{C^*}+b.HP(0.07)_{Si}-HP(0.07)_{TH}. \tag{5}$$

One can also try to reduce the following expression:

$$a.HP(10)_{C^*}+b.HP(10)_{Si}-HP(0.07)_{TH}. \tag{6}$$

In the expressions (5) and (6), $HP(0.07)_{C^*}$, $HP(0.07)_{Si}$, $HP(0.07)_{TH}$, $HP(10)_{C^*}$, $HP(10)_{Si}$, and $HP(10)_{TH}$ respectively represent the responses in terns of doses equivalent to 0.07 mm or 10 mm of tissue under the skin for the diamond based detector, the silicon based detector and human tissue.

Figure 4:
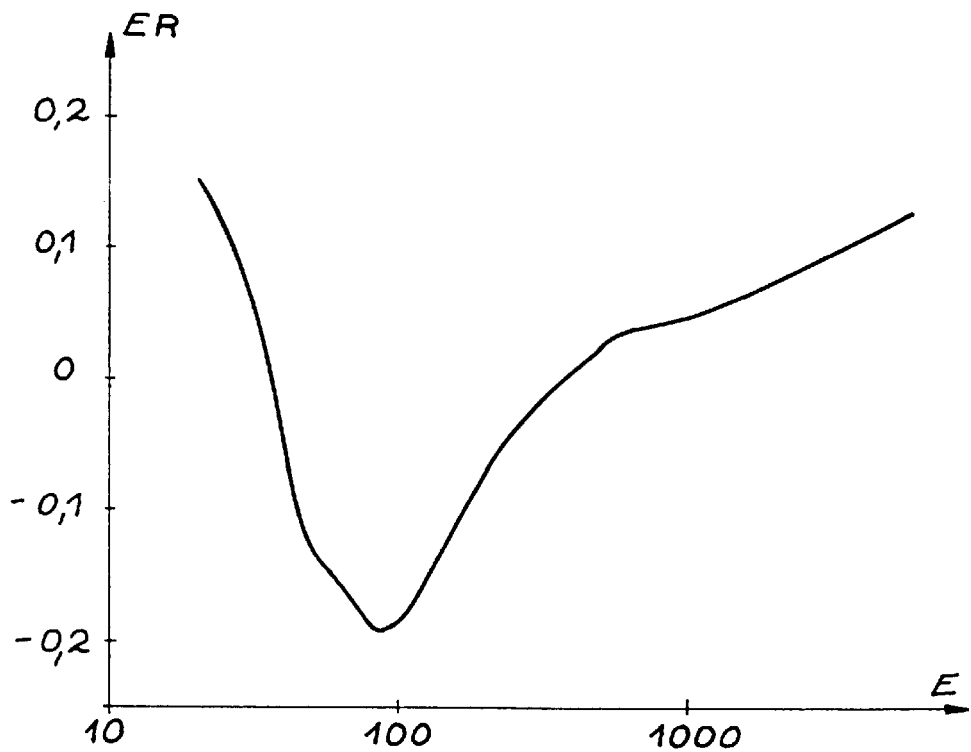
FIG. 4 represents the variations of the relative error between the combined responses of said detectors and the response of human tissues according to the photon energy when/superficial dose HP(0.07) is measured.

FIG. 4 shows the results of the optimization concerning HP(0.07).

More precisely, FIG. 4 shows the variations of the relative error ER given below, according to the photon energy E, for the coefficient HP(0.07):

$$(a.HP(0.07)_{C^*}+b.HP(0.07)_{Si}-HP(0.07)_{TH})/HP(0.07)_{TH}. \tag{7}$$

Here again, it appears that the error between responses does not exceed 20% from 20 keV on.

Figure 5:
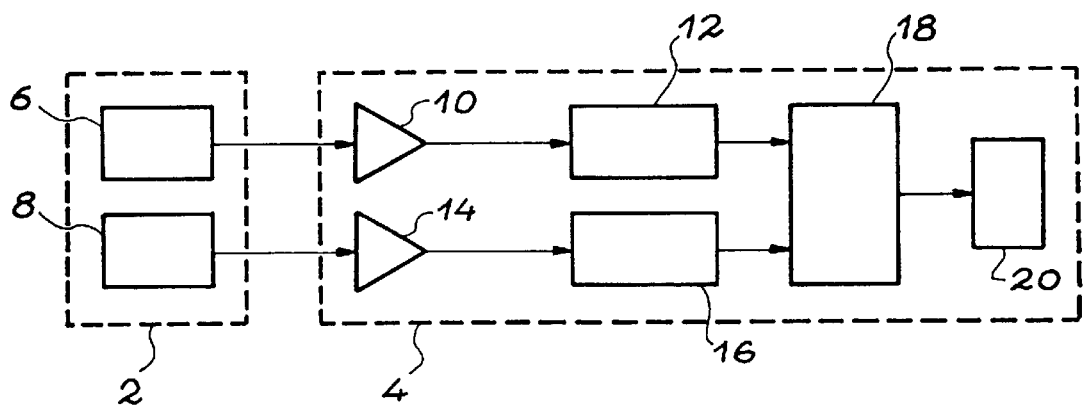
FIG. 5 is a diagram of a first particular embodiment of the inventive dosimeter that can be used for measuring large doses.

FIG. 5 is a schematic view of an X-gamma dosimeter in accordance with the invention.

The dosimeter of FIG. 5 comprises:

a means 2 for detecting X and gamma radiation, provided for supplying signals that are functions of the dose absorbed by said detection means 2; and an electronic means 4 for processing such signals, said electronic processing means 4 being provided for determining, from the signals, the dose absorbed by human tissues.

In accordance with the invention, the detection means 2 comprises a silicon based photodetector 6 and a diamond based detector 8 placed together next to each other.

Figure 6:
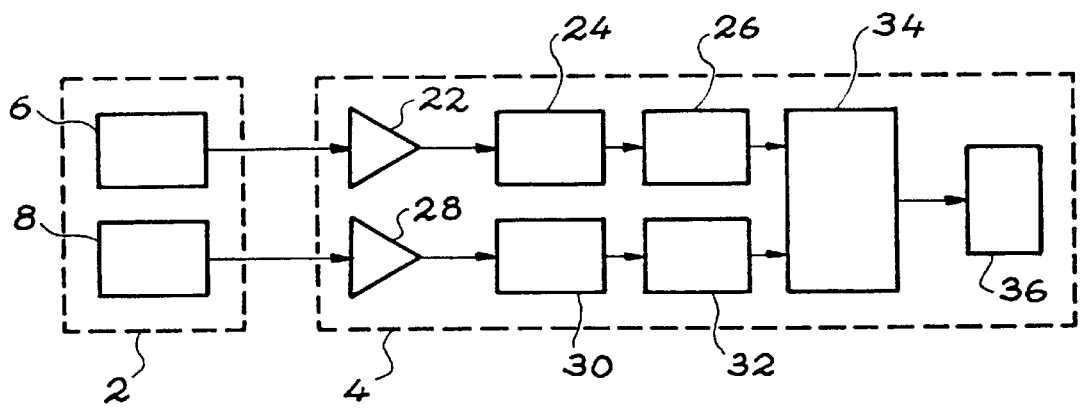
FIG. 6 is a schematic view of another particular embodiment of said dosimeter for measuring small doses.
Figure 7:
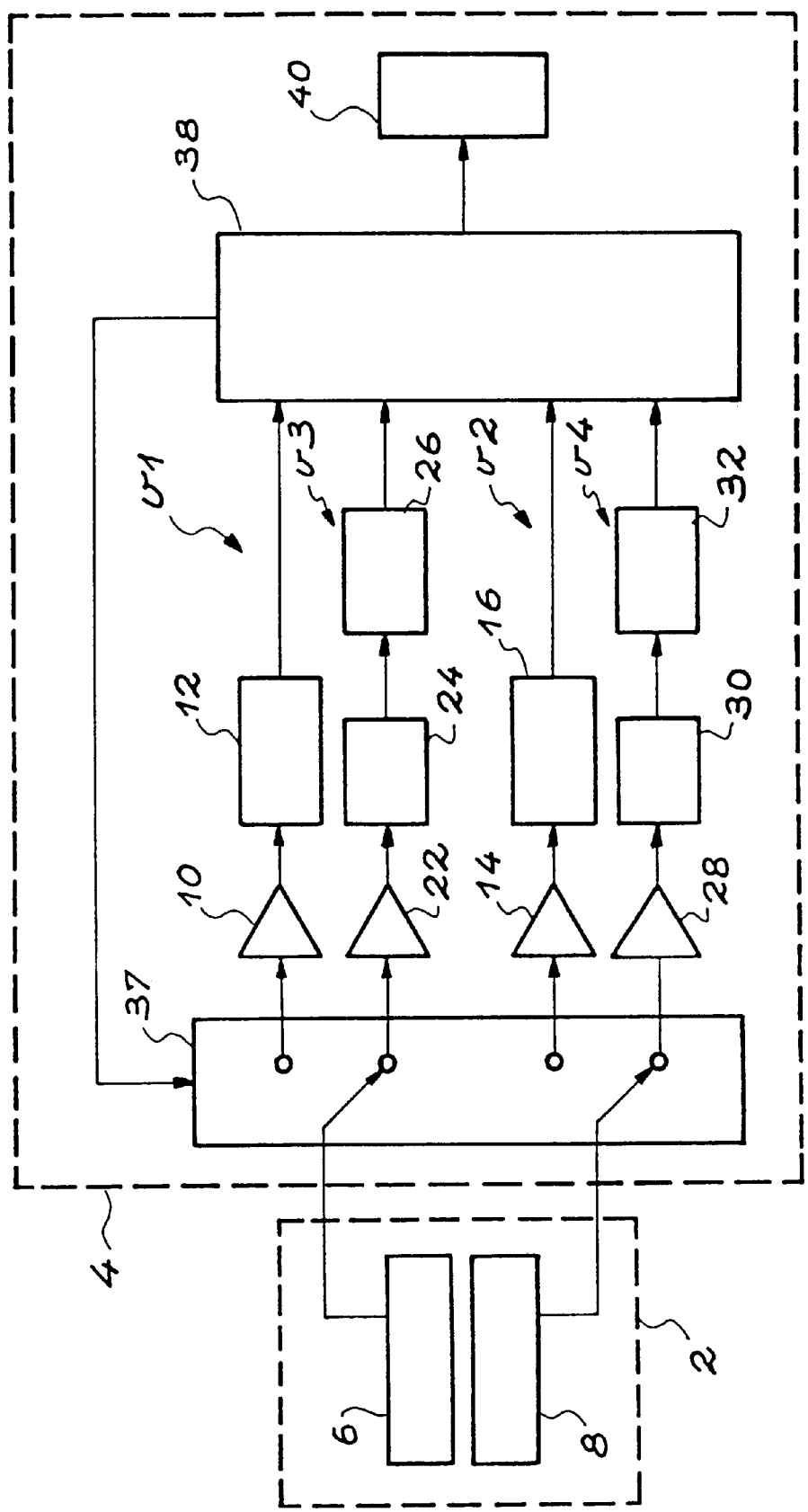
FIG. 7 is a schematic view of another particular embodiment of said dosimeter that can be used for measuring large doses and for measuring small doses.

It is specified that in FIG. 5 the electric power supply means of the radiation detection means 2 and the electronic processing means 4, as well as the dosimeter cover, are not represented and that this also applies to FIGS. 6 and 7.

The dosimeter according to the invention, which is represented schematically in FIG. 5, is designed for measuring large absorbed doses.

For this purpose, the electronic processing means 4 comprises:

a measuring channel related to detector 6 and successively comprising a current preamplifier 10 and an analog-to-digital converter 12 for processing the signals supplied by said detector 6, and another measuring channel related to detector 8 and successively comprising a current preamplifier 14 and an analog-to-digital converter 16 for processing the signals supplied by said detector 8.

The electronic processing means 4 also comprises a microprocessor 18 that receives as an input the signals supplied by the analog-to-digital converters 12 and 16.

Microprocessor 18 stores the coefficients a* and b* mentioned above.

In fact, these theoretical coefficients are preferably adjusted according to the experimental dosimetric responses obtained by means of calibrated sources or generators and according to the actual performance of detectors 6 and 8.

Microprocessor 18 determines the sum of signals processed in the measuring channels, weighted by these coefficients a* and b*, and enables back-tracing of the intended dosimetric quantity.

The electronic processing means 4 also comprises a display means 20, e.g. a liquid crystal display, that is connected to microprocessor 18 and allows for displaying the value of the dosimetric quantity that has been determined by said microprocessor 18.

It should be noticed that with the dosimeter of FIG. 5 it could be possible to obtain several dosimetric quantities, such as HP(10), BP(0.07) or even the dose in air, by storing several couples (a, b) suitable for such different quantities.

The silicon based detector 6 is a photodiode commercially available from the companies HAMAMATSU, ORTEC, or EURISYS MESURES.

The diamond based detector 8 can be composed of a thin layer of artificial diamond, prepared e.g. according to the microwave chemical vapor deposit technique, or a thin layer of type IIa or Ib natural diamond, on two opposite sides of which ohmic metal contacts or particular blocking junctions are deposited.

This type of diamond based detector is commercially available from the companies ASTEX, NORTON, and DE BEERS.

The dosimeter according to the invention, which is represented schematically in FIG. 6, is designed for measuring small absorbed doses.

It comprises again the detection means 2, comprising detectors 6 and 8, as well as the electronic processing means 4.

Here, said electronic processing means 4 comprises two measuring channels:

one being related to detector 6 and comprising successively a charge amplifier 22, a discriminator 24 and a pulse counter 26 for processing the signals supplied by said detector 6, and the other being related to detector 8 and comprising successively a charge amplifier 28, a discriminator 30 and a pulse counter 32 for processing the signals supplied by said detector 8.

The pulse counters 26 and 32 are connected to the input of a microprocessor 34 that stores the appropriate coefficients of the linear combination and processes the signals it receives from the measuring channels for determining the intended absorbed dose.

The electronic processing means 4 also comprises display means 36 that is connected to microprocessor 44 and ensures display of the measuring result.

FIG. 7 is a schematic view of another dosimeter according to the invention for measuring both small absorbed doses and large absorbed doses.

The dosimeter of FIG. 7 further comprises the previously mentioned detection means 2, comprising detectors 6 and 8 as well as electronic processing means 4.

In the case of FIG. 7, this electronic processing means 4 comprises four measuring channels.

Both measuring channels appear on FIG. 5:

one is referenced as v1, comprising the components referenced as 10 and 12, and the other is referenced as v2, comprising the components referenced as 14 and 16.

Also, two measuring channels appear on FIG. 6:

one is referenced as v3, comprising the components referenced as 22, 24, and 26, and the other is referenced as v4, comprising the components referenced as 28, 30, and 32.

The electronic processing means 4 of the dosimeter in FIG. 7 also comprises a switch 37 and a microprocessor 38.

Switch 37 is installed between the respective outputs of detectors 6 and 8 and the four measuring channels.

Microprocessor 38 receives as an input the signals supplied by the outputs of these measuring channels.

Moreover, microprocessor 38 controls switch 37.

The latter is capable of adopting two states, namely:

a first state wherein it ensures sending the signals respectively supplied by detectors 6 and 8 to the measuring channels v1 and v2, and a second state wherein it ensures sending the signals respectively supplied by detectors 6 and 8 to the measuring channels v3 and v4.

Depending on whether a small absorbed dose or a large absorbed dose is to be measured, microprocessor 38 is controlled for placing switch 37 in the corresponding state.

Microprocessor 38 is still storing the coefficients of the appropriate linear combinations and determines the intended absorbed dose.

The electronic processing means 4 also comprises a display means 40 that is connected to microprocessor 38 and provided for displaying the measuring result.

The present invention is not limited to measuring the dose absorbed by human tissues. It can also be applied for measuring other dosimetric quantities, such as e.g. the equivalent of the ambient dose. The electronic processing means 4 of FIGS. 5, 6, and 7 are then provided for returning in the best possible way this ambient dose equivalent that is labeled as H*. The invention is then used as a radiation meter.

In this case, the respective values a* and b* of the coefficients a and b of the linear combination a.H*(C)+b.H* (Si) are determined enabling the reduction of the expression $$a.H^*(C)+b.H^*(Si)-H^*$$

where H*(C), H*(Si) and H* represent respectively the response of the diamond based detector, the response of the silicon based detector and the actual ambient dose equivalent also called "actual equivalent dose."

These values a* and b* are stored in microprocessor 18 (FIG. 5) or 34 (FIG. 6) or 38 (FIG. 7) depending on whether the apparatus of FIGS. 5 or 6 or 7 is to be used.

Moreover, the present invention is not limited to using a linear combination: it is also possible to use a non-linear combination of the responses R(C) and R(Si) of detectors 6 and 8, i.e. a function F(R(C), R(Si)) of these responses, which is not linear.

Certainly, generally speaking, if radiation with different energy values interacts simultaneously with both detectors 6 and 8, only a linear combination is likely to produce a good approximation of the dosimetric quantity measured.

However, if the incident radiation is of the single energy type, a non linear combination is likely to supply a better correlation for the dosimetric quantity measured.

For strictly illustrative purposes and by no means to be restrictive, the actual dose absorbed by human tissues R(TH) is to be determined in the case of such single energy radiation and, for this purpose, the coefficient values a and b are determined by any appropriate method making it possible to minimize the reduction of the expression $$aR^n(C)+bR^n(Si)-R(TH)$$

where n is a real, non-zero number, other than 1.

What is claimed is:

1. An X-gamma dosimeter, comprising:
   a first unfiltered X and gamma radiation detector and a second unfiltered X and gamma radiation detector, said first and second detectors responding differently in relation to the dose absorbed at a relatively low energy, the first detector overestimating the dose absorbed at said relatively low energy with regard to human tissues, the second detector underestimating the dose absorbed at said relatively low energy with regard to human tissues, and an electronic processor for combining signals supplied by said first and second conductor detectors, respectively, said combination being optimized so as to report accurately the dosimetric quantity within a relatively large energy range.

2. The dosimeter according to claim 1, wherein said combination comprises a linear combination of signals respectively supplied by said first and second detectors.

3. The dosimeter according to claim 1, wherein said combination comprises a nonlinear combination of signals respectively supplied by said first and second detectors.

4. The dosimeter according to claim 1, wherein said dosimetric quantity is the dose absorbed by human tissues.

5. The dosimeter according to claim 4, wherein the electronic processor reports an actual dose globally absorbed by human tissues.

6. The dosimeter according to claim 4, wherein the electronic processor reports an actual dose absorbed by human tissue for a given tissue depth.

7. The dosimeter according to claim 6, wherein the electronic processor reports an equivalent of a superficial individual dose labeled HP(0.07).

8. The dosimeter according to claim 6, wherein said electronic processor reports an equivalent of a deep individual dose labeled HP(10).

9. The dosimeter according to claim 1, wherein said dosimetric quantity is the equivalent of an ambient dose, and said dosimeter is used as a radiation meter.

10. The dosimeter according to claim 1, wherein said first detector comprises a silicon based photodiode.

11. The dosimeter according to claim 1, wherein said second detector comprises a diamond based detector.

12. The dosimeter according to claim 1, wherein said electronic processor comprises, for each of said first and second detectors, a first measuring channel comprising a current preamplifier followed by an analog-to-digital converter, for measuring relatively large doses.

13. The dosimeter according to claim 12, wherein said electronic processor further comprises, for each of said first and second detectors, a second measuring channel comprising a charge preamplifier followed by a discriminator, in turn followed by a pulse counter for measuring relatively small doses.

14. The dosimeter according to claim 13, wherein said electronic processor further comprises, for each of said first and second detectors, a charge preamplifier followed by a discriminator, in turn followed by a pulse counter, for measuring small doses, and further comprises a switch for sending signals supplied by said first and second detectors, either to said corresponding first or second measuring channels, for measuring either said relatively large doses or or said relatively small doses.

* * * * *